United States Patent [19]

Kline

[11] 3,757,161

[45] Sept. 4, 1973

[54] TELEVISION CAMERA GEOMETRIC DISTORTION CORRECTION SYSTEM

[75] Inventor: Donald D. Kline, Palo Alto, Calif.

[73] Assignee: Commercials Electronics Inc., Mountain View, Calif.

[22] Filed: Sept. 3, 1970

[21] Appl. No.: 69,293

[52] U.S. Cl. .......... 315/276 D

[51] Int. Cl. .......... H01j 29/70

[58] Field of Search .......... 315/276 D, 27 TD, 315/28, 29, 10, 24, 22

[56] References Cited

UNITED STATES PATENTS

| | | | |
|---|---|---|---|
| 3,501,669 | 3/1970 | Henderson | 315/24 |
| 3,422,305 | 1/1969 | Infante | 315/31 |
| 3,444,426 | 5/1969 | Buechel | 315/24 |
| 2,898,489 | 8/1959 | Weimer | 315/10 |

*Primary Examiner*—Carl D. Quarforth
*Assistant Examiner*—J. M. Potenza
*Attorney*—Townsend and Townsend

[57] ABSTRACT

A geometric distortion correction system for a television camera in which a suitable combination of sawtooth and parabolic wave forms at the horizontal and vertical repetition rates are applied to one of the grids of the camera tube. These wave forms may be regarded as functioning to increase or decrease the deflection sensitivity of the camera tube in synchronism with the scanning thereof, so that the application of conventional linear wave forms to the deflection coils of the camera tube will result in a non-linear scan which, in turn, corrects for the geometric distortion of the camera tube. Preferably, the sawtooth and parabolic wave forms are applied to the focus or G3 grid of the camera tube, the amplitudes and polarities of the wave forms being determined by the nature of the geometric distortion to be corrected for.

6 Claims, 6 Drawing Figures

PATENTED SEP 4 1973 3,757,161

Figure 1:
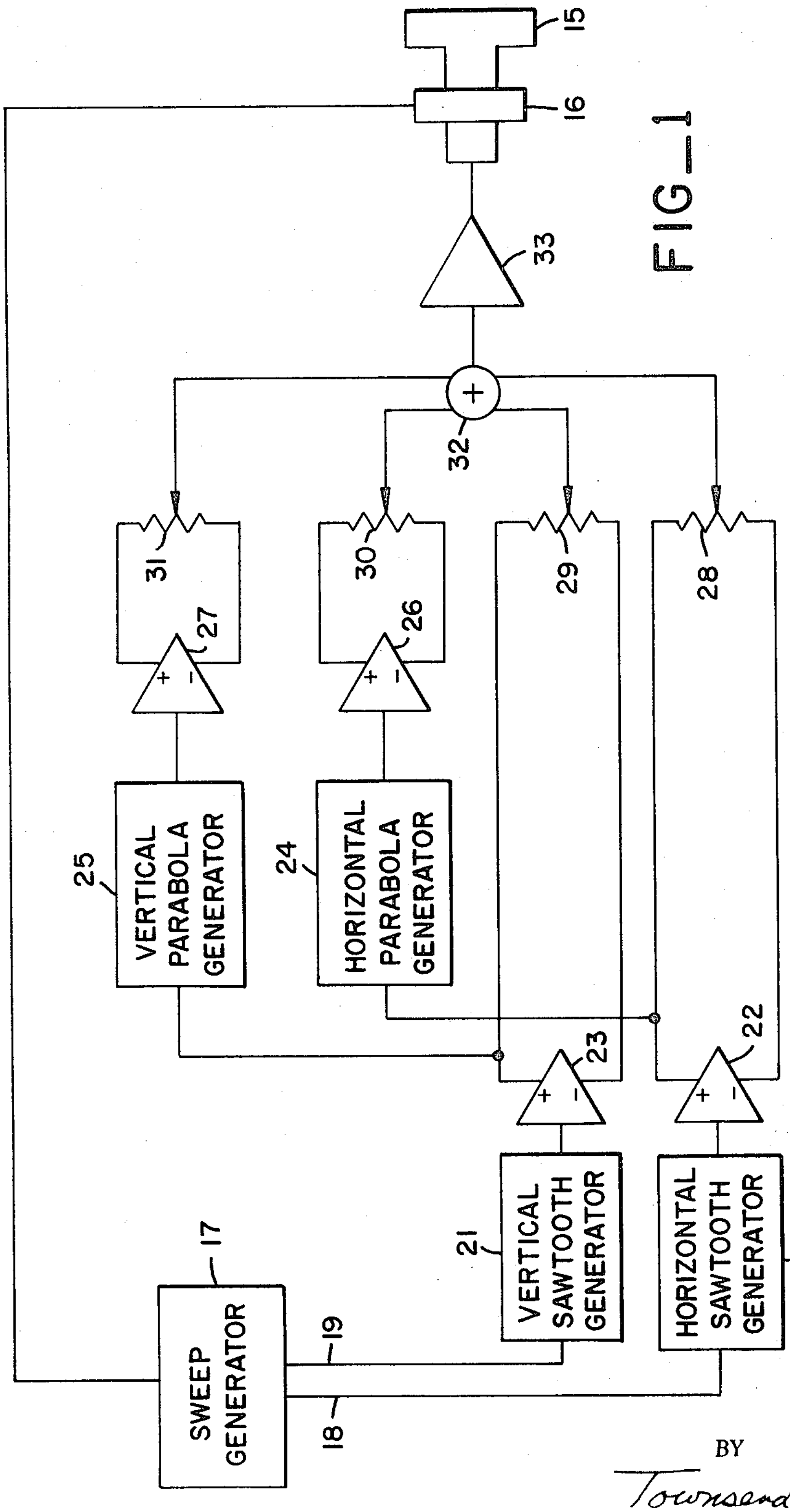

INVENTOR.
DONALD D. KLINE
BY
Townsend and Townsend
ATTORNEYS

TELEVISION CAMERA GEOMETRIC DISTORTION CORRECTION SYSTEM

This invention relates to a geometric distortion correction system for television cameras.

In a television camera, certain types of geometric distortion, namely pin cushion, barrel or keystone distortions are often encountered. The degradation in performance produced thereby, while sometimes tolerable in a black and white television camera, is generally unacceptable in a color television camera, where the images are three camera tubes and are superimposed to produce the resultant television picture. In particular, these geometric distortions result in a misregistration of the images of the three camera tubes, and thus a marked degradation in image quality.

Heretofore, attempts have been made to correct for pin cushion, barrel and/or keystone distortion in a television camera by applying wave shaping techniques to the electrical signals applied to the deflection coils of the camera tubes. Due to the inductive properties of the deflection coils, and the level of current required to accomplish the deflection of the beam of a camera tube, such wave shaping techniques have proved to be unduly complex, costly and unreliable. Furthermore, prior art geometric distortion correction systems have failed to adequately correct for pin cushion, barrel and keystone distortion, so that particular types of camera tubes having a high degree of geometric distortion have heretofore proved unacceptable for use in color television cameras.

Applicant has found that the geometric distortion of a camera tube may be substantially corrected by applying a suitable combination of sawtooth and parabolic wave forms at the horizontal and vertical repetition rates to one of the grids of the camera tube. These wave forms may be regarded as functioning to increase or decrease the deflection sensitivity of the camera tube in synchronism with the scanning thereof, so that the application of conventional linear wave forms to the deflection coils of the camera tube will result in a nonlinear scan which, in turn, corrects for the geometric distortion of the camera tube. In a preferred embodiment of the present invention, the sawtooth and parabolic signals are applied to the focus or G3 grid of the camera tube, the amplitudes and polarities of the various wave forms being determined by the nature of the geometric distortion to be corrected for.

Accordingly, it is an object of the present invention to provide a simple, inexpensive and reliable geometric distortion correction system for a television camera.

Another object of the present invention is to provide a geometric distortion correction system for a television camera in which sawtooth and parabolic wave form signals at the horizontal and vertical repetition rates are applied to one of the grids of the camera tube to achieve geometric distortion correction.

Such a geometric distortion correction system is advantageous in that it permits the use of high sensitivity camera tubes in a color television camera, which camera tubes were heretofore unacceptable for such use due to the high level of geometric distortion inherent therein. Furthermore, as will be more readily apparent hereinafter, the geometric distortion correction system according to the present invention is relatively simple, inexpensive and reliable, and achieves a high degree of geometric distortion correction.

These and other objects, features and advantages of the present invention will be more readily apparent from the following detailed description of the present invention, with reference to the accompanying drawings, wherein:

FIG. 1 is a block diagram of a portion of a television camera incorporating the geometric distortion correction system according to the present invention;

FIG. *2a* is a diagrammatic representation of a rectangular, undistorted television image; and FIGS. *2b*, *2c*, *2d* and *2e* are diagrammatic representations of television images having pin cushion, barrel and keystone distortions.

Referring initially to FIG. 1, there is shown a television camera tube 15 upon which a desired region in space is optically imaged by a lens system (not shown). A deflection coil 16 is disposed around the neck of camera tube 15. Deflection coil 16 is energized by a sweep generator circuit 17 in a conventional manner, so that the beam of camera tube 15 will scan the target thereof in a conventional television raster. The target of cathode ray tube 15 will thus be read by the beam thereof, to produce video signals which are then amplified and otherwise processed in a conventional manner to form the video output signals of the television camera.

Such scanning of the beam of camera tube 15 by deflection coil 16 and sweep generator circuit 17 should produce a rectangular television image as depicted in FIG. *2a*. However, geometric distortions inherent in camera tube 15 may produce a somewhat distorted television image. For example, the television image thus produced may resemble the television images depicted in FIGS. *2b*, *2c*, *2d* or *2e*, which images possess pin cushion, barrel, horizontal keystone and vertical keystone distortions, respectively. Of course, the geometric distortion may comprise combinations of more than one of these distortions.

Referring again to FIG. 1, the distortion correction system according to the present invention will now be described in detail. Sweep generator circuit 17, in addition to producing the excitation for deflection coil 16, conventionally produces horizontal and vertical blanking pulses, on leads 18 and 19, respectively, which blanking signals provide the input signals to the geometric distortion correction system according to the present invention. The horizontal and vertical blanking signals on leads 18 and 19 are respectively applied to a pair of sawtooth generator circuits 20 and 21. Sawtooth generators 20 and 21 function to produce repetitive ramp wave forms at the horizontal and vertical repetition rates, respectively, Furthermore, the sawtooth wave forms thus produced will have the same time duration, and will coincide with, the unblanked or video producing time intervals of the scanning of the beam of camera tube 15 by deflection coil 16.

The outputs of horizontal sawtooth generator 20 and vertical sawtooth generator 21 are respectively connected to the inputs of a pair of amplifiers 22 and 23. Amplifiers 22 and 23 have bi-polarity outputs, and are thus adapted to produce positive and negative sawtooth wave forms at their outputs.

The positive outputs of amplifiers 22 and 23 are respectively connected to the inputs of a pair of parabola generator circuits 24 and 25. Parabola generator circuits 24 and 25 function to integrate the horizontal and vertical sawtooth wave forms to produce parabolic wave form signals at the horizontal and vertical repetition rates. Of course, since the sawtooth wave forms correspond to the unblanked time intervals of the scanning of the beam of camera tube 15, the parabolic wave forms thus produced will also correspond to these time intervals. Typically, horizontal parabola generator 24 and vertical parabola generator 25 may comprise miller integrater circuits. The outputs of horizontal parabola generator 24 and vertical parabola generater 25 are respectively connected to the inputs of a pair of amplifiers 26 and 27, having bi-polarity outputs. Thus, positive and negative parabolic signals at the horizontal repetition rate will appear at the outputs of amplifier 26, and positive and negative parabolic signals at the vertical repetition rate will appear at the outputs of amplifier 27.

The outputs of amplifier 22 are connected across a potentiometer 28. Similarly, the outputs of amplifiers 23, 26, and 27 are respectively connected across three potentiometers 29, 30 and 31. The wipers of potentiometers 28, 29, 30 and 31 are connected to the inputs of a summing junction 32. Thus, sawtooth and parabolic wave forms at the horizontal and vertical rates will be applied to summing junction 32. Of course, the amplitude and polarity of each signal will be determined by the setting of the respective potentiometer 28, 29, 30 or 31 associated therewith.

The output of summing junction 32 is connected to the input of an amplifier 33. It is thus apparent that the output of amplifier 33 will comprise a composite wave form signal having sawtooth and parabolic components at the horizontal and vertical repetition rates, the amplitudes and polarities of these components being determined by the settings of potentiometers 28, 29, 30 and 31.

According to the present invention, the composite wave form signal at the output of amplifier 33 is applied to one or more of the grids of camera tube 15 to synchronously modulate the deflection sensitivity thereof. In particular, camera tube 15 typically comprises a cathode and a plurality of grids arranged axially along the path of the electron beam. The grid closest to the cathode is generally referred to as G1, while the other grids are referred to in increasing order from the cathode G2, G3, and G4. A suitable DC voltage is applied to G1 to control the beam current of camera tube 15. Grids G2, G3 and G4 are typically employed to accelerate and focus the beam of camera tube 15, and are maintained at suitable constant DC potentials. Applicant has found that varying the voltage of eother G3 or G4 affects the deflection sensitivity of the beam of camera tube 15. In particular, applicant has found that by adding the composite wave form at the output of amplifier 33 to the constant DC voltages present at grids G3 or G4, the deflection sensitivity of the beam of camera tube 15 will be synchronously varied. Furthermore, the composite wave form at the output of amplifier 33 may be suitably varied by potentiometers 28, 29, 30 and 31 to provide a synchronous modulation of the deflection sensitivity of the beam of camera tube 15 to substantially correct for geometric distortion inherent therein.

Applicant has found that the application of the composite wave form at the output of amplifier 33 to the third or focus grid G3 has produced the most satisfactory results. Furthermore, applicant has found that the magnitude of composite wave form signal necessary to achieve substantial correction of geometric distortion is so small, with respect to the constant DC voltage present at fpcus grid G3 as to substantially unaffect the focus of the beam of camera tube 15.

Applicant has further found that the defocusing effects introduced by the application of composite wave form signal to either grides G3 or G4 may be further minimized by applying composite wave form signals of opposite polarities to grids G3 and G4. In this manner, the defocusing effects will be minimized, without detracting from the geometric distortion thus achieved.

Figures 2A, 2B, 2C, 2D, 2E:
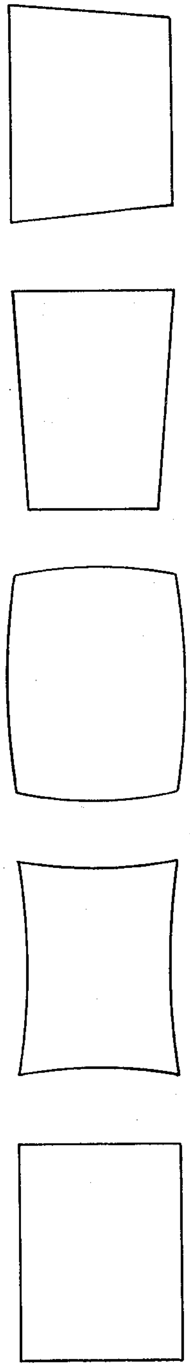

In operation, potentiometers 28, 29, 30 and 31 are initially set to their intermediate positions where no sawtooth or parabolic wave forms are applied to focus grid G3, and a test pattern is optically imaged upon camera tube 15. After the other operating controls of the camera have been set in accordance with conventional procedures, the operatpr observes the video output of the camera on a suitable monitor. If the resultant video image displays pin cushion or barrel distortion, as for example depicted in FIGS. 2*b* and 2*c*, potentiometers 30 and 31 are adjusted to correct therefor, so as to produce the desired rectangular image depicted in FIG. 2*a*. If, however, the camera operator observes horizontal or vertical keystone distortion, as depicted in FIGS. 2*d* and 2*e*, the camera operator adjusts potentiometers 28 or 29 to eliminate same, and thus produce the desired rectangular image depicted in FIG. 2*a*. Of course, the geometric distortion may comprise a composite of these distortions, thus requiring suitable adjustments of all of the potentiometers 28, 29, 30 and 31. Once the geometric distortion correction system according to the present invention has thus been aligned and adjusted, the operation of the television camera may proceed in a conventional manner.

While the geometric distortion correction system according to the present invention has been described with respect to one camera tube 15, as would typically be provided in a black and white or monochromatic television camera, it is apparent that the geometric distortion correction system according to the present invention is equally applicable to color television cameras. In particular, a color television camera will comprise three camera tubes, each of which may display geometric distortions. Accordingly, two additional sets of potentiometers 28, 29, 30 and 31 may be provided, each set operative to produce a different composite wave form, which composite wave forms will be respectively applied to the focus grids G3 of the respective camera tubes, by provision of additional summing junctions 32 and additional amplifiers 33. The operative procedures thus described for the single camera tube 15 must, of course, be repeated for each of the camera tubes of the color television camera.

Applicant has found the geometric distortion correction system of the present invention to be advantageous, in that it has permitted the use of camera tubes in a color television camera, which were heretofore unacceptable due to the high degree of geometric distortion inherent therein, and thus the misregistration of the various images produced by the camera tubes. In particular, applicant has successfully constructed a color television camera having a distortion correction system according to the present invention using secondary electron conduction vidicon camera tubes. Such camera tubes are advantageous in that they possess an extremely high degree of sensitivity. However, such camera tubes also possess a high degree of geometric distortion. By employing the geometric distortion system according to the present invention, applicant has achieved substantial correction of the geometric distortion inherent in such tubes, and has thus produced a color television camera having excellent registration of the images produced by the various camera tubes, and the desirable high degree of light sensitivity.

While a particular embodiment of the present invention has been shown and described, it is apparent that adaptations and modifications may be made without departing from the spirit and scope of the present invention, as set forth in the claims.

What is claimed is:

1. A method for correcting geometric distortion in the camera tube of a television camera comprising the steps of generating sawtooth wave form signals at the horizontal and vertical repetition rates, generating parabolic wave form signals at the horizontal and vertical repetition rates, applying said sawtooth and parabolic wave form signals to at least one of the grids of said camera tube and adjusting the amplitudes and polarities of the applied parabolic and sawtooth wave forms to substantially correct for the geometric distortion of said camera tube.

2. The method according to claim 1 wherein the step of generating parabolic wave form signals comprises integrating said sawtooth wave form signals.

3. The method according to claim 1 wherein the step of applying comprises coupling said sawtooth and parabolic wave form signals with opposite polarities to the G3 and G4 grids of said camera tube.

4. The method for correcting geometric distortion in the camera tubes of a color television camera comprising the steps of generating sawtooth wave form signals at the horizontal and vertical repetition rates, generating parabolic wave form signals at the horizontal and vertical repetition rates, applying said sawtooth and parabolic wave form signals to at least one of the grids of each of said camera tubes and adjusting the amplitudes and polarities of the parabolic and sawtooth wave forms applied to each of said camera tubes independently to substantially correct for the geometric distortion of said camera tubes.

5. The method according to claim 4 wherein the step of generating parabolic wave form signals comprises integrating said sawtooth wave form signals.

6. The method according to claim 4 wherein the step of applying comprises coupling said sawtooth and parabolic wave form signals with opposite polarities to the G3 and G4 grids of each of said camera tubes.

* * * * *